(12) United States Patent
Huang et al.

(10) Patent No.: US 11,079,930 B2
(45) Date of Patent: Aug. 3, 2021

(54) METHOD AND TERMINAL FOR DISPLAYING A PLURALITY OF CONTENT CARDS

(71) Applicant: Huawei Technologies Co., Ltd., Shenzhen (CN)

(72) Inventors: Liwei Huang, Beijing (CN); Kai Qian, Beijing (CN); Zhiyan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/754,560

(22) PCT Filed: Oct. 9, 2018

(86) PCT No.: PCT/CN2018/109500
§ 371 (c)(1),
(2) Date: Apr. 8, 2020

(87) PCT Pub. No.: WO2019/072172
PCT Pub. Date: Apr. 18, 2019

(65) Prior Publication Data
US 2020/0257443 A1  Aug. 13, 2020

(30) Foreign Application Priority Data

Oct. 9, 2017 (CN) .......................... 201710931803.2
Dec. 7, 2017 (CN) .......................... 201711287217.5

(51) Int. Cl.
*G06F 3/0488* (2013.01)
*G06F 3/0485* (2013.01)
*H04M 1/72442* (2021.01)

(52) U.S. Cl.
CPC ...... *G06F 3/04883* (2013.01); *G06F 3/04855* (2013.01); *H04M 1/72442* (2021.01)

(58) Field of Classification Search
CPC .... G06F 3/0483; G06F 3/0485; G06F 3/0488; G06F 3/04883; G06F 3/04855; H04M 1/72558
See application file for complete search history.

(56) References Cited

U.S. PATENT DOCUMENTS

2010/0321396 A1  12/2010  Xu
2011/0022957 A1   1/2011  Lee
(Continued)

FOREIGN PATENT DOCUMENTS

CN   103229133 A   7/2013
CN   103677596 A   3/2014
(Continued)

OTHER PUBLICATIONS

Trukhin, Y., et al., "Flipping Cards—Animation," Feb. 20, 2014, 6 pages.
(Continued)

*Primary Examiner* — Stacy Khoo
(74) *Attorney, Agent, or Firm* — Conley Rose, P.C.

(57) ABSTRACT

A method for displaying a plurality of content cards, where of content cards include a current content card and a stacked content card, display modes of the content cards include a stacking mode and a browsing mode, a display area of the current content card is divided into an edge area and a content display area, and the method includes: detecting a start location and a sliding direction of finger sliding, and determining an execution action for the content card based on the display mode, a location relationship between the start location and the content display area of the current content card, the sliding direction, and a relationship between an upper part or a lower part of the current content card and a predetermined area, where the execution action includes at least one of switching between modes or con-
(Continued)

tinuously displaying content of adjacent content cards in the browsing mode.

20 Claims, 11 Drawing Sheets

(56) References Cited

U.S. PATENT DOCUMENTS

| | | |
|---|---|---|
| 2012/0159364 A1 | 6/2012 | Hyun |
| 2016/0357368 A1 | 12/2016 | Federighi et al. |
| 2016/0357404 A1 | 12/2016 | Alonso Ruiz et al. |
| 2017/0003796 A1 | 1/2017 | Kono |
| 2017/0083171 A1 | 3/2017 | Nelson |

FOREIGN PATENT DOCUMENTS

| | | |
|---|---|---|
| CN | 104881224 A | 9/2015 |
| CN | 105095429 A | 11/2015 |
| CN | 105204842 A | 12/2015 |
| CN | 105353950 A | 2/2016 |
| CN | 105389372 A | 3/2016 |
| CN | 303701939 S | 6/2016 |
| CN | 106354357 A | 1/2017 |
| EP | 2615535 A1 | 7/2013 |
| EP | 3018559 A1 | 5/2016 |
| JP | 2015106165 A | 6/2015 |
| JP | 2017528776 A | 9/2017 |
| KR | 20110011002 A | 2/2011 |
| KR | 20120066914 A | 6/2012 |

OTHER PUBLICATIONS

Purdy, K., "Apples Passbook is Definitely Not Leading the Phone-Based Wallet Charge," Sep. 24, 2012, 5 pages.

Crider, M., "Google's News and Weather App, AKA The 'Genie Widget' Gets a Massive 2.0 Update and a Full Play Store Release," Aug. 26, 2014, 10 pages.

METHOD AND TERMINAL FOR DISPLAYING A PLURALITY OF CONTENT CARDS

CROSS-REFERENCE TO RELATED APPLICATIONS

This application is a U.S. National Stage of International Patent Application No. PCT/CN2018/109500 filed on Oct. 9, 2018, which claims priority to Chinese Patent Application No. 2017/11287217.5 filed on Dec. 7, 2017 and Chinese Patent Application No. 2017/10931803.2 filed on Oct. 9, 2017. The aforementioned applications are hereby incorporated by reference in their entireties.

TECHNICAL FIELD

The present invention relates to the field of multimedia technologies, and in particular, to a method and a terminal for displaying a plurality of content cards.

BACKGROUND

A card-based layout can integrate a plurality of elements such as information, pictures, texts, operation buttons, and links into one card. In this way, a user can move cards or place cards in different layers. Based on such a card-based layout, content is presented more intuitively. In addition, different content is displayed differently, so that the user can perform operations more easily and accurately. For example, the user may accurately select, from a card integrating a plurality of elements, an operation button that needs to be moved, and move the operation button to the bottom of a display screen. For another example, the user may accurately select, from a card integrating a plurality of elements, a text that needs to be placed in a layer, drag the selected text to an uppermost layer of a display screen, and amplify and display the selected text, to facilitate user reading.

Currently, there are mainly two forms of using cards, One is a waterfall-style content card layout in which each individual card is a small content element. This layout is suitable for small data blocks, and all data blocks have similar content. Generally, as a scroll bar on a page scrolls down to continuously load data blocks to the bottom of a current display screen, the user can browse content of a plurality of content units in a short period of time. The other is display of different categories of content on different cards. The cards are stacked at different layers. The user taps a card of interest to display a full-screen preview screen of the corresponding card. This makes it convenient for the user to read content of the card of interest.

Generally, the current styles of content card layout allow presentation of a plurality of pieces of card content at the same time to facilitate user reading. However, because switching between different types of cards is subject to a latency, it is difficult for the user to obtain timely feedback and good user experience.

SUMMARY

Embodiments of the present invention provide a method for displaying a plurality of stacked content cards on a terminal and a terminal for displaying a plurality of stacked content cards, to quickly switch a plurality of content cards and browse content of the content cards.

According to a first aspect, an embodiment of the present invention provides a method for displaying a plurality of content cards on a terminal, where the plurality of content cards include a current content card and at least one stacked content card; display modes of the plurality of content cards include a stacking mode and a browsing mode, where in the stacking mode, content of the current content card and an edge of the at least one stacked content card are displayed, and in the browsing mode, the content of the current content card is displayed in full screen; a display area of the current content card is divided into an edge area and a content display area; and the method includes: detecting a start location and a sliding direction of finger sliding; and determining an execution action for the content card based on the display mode, a location relationship between the start location and the content display area of the current content card, the sliding direction, and a relationship between an upper part or a lower part of the current content card and a predetermined area, where the execution action includes at least one of the following: switching between the stacking mode and the browsing mode, and continuously displaying content of adjacent content cards in the browsing mode, where the adjacent content cards include the current content card and a content card that is among the at least one stacked content card and adjacent to the current content card.

In a possible implementation, the predetermined area includes a first predetermined area, and the determining an execution action for the content card includes: in response to that the current content card is in the stacking mode, that the start location falls within the content display area, that the sliding direction is upward, and that the upper part of the current content card falls within the first predetermined area, switching from the stacking mode to the browsing mode, and translating card content upward in the content display area of the current content card.

In a possible implementation, the predetermined area includes a second predetermined area, and the determining an execution action for the content card includes: in response to that the current content card is in the browsing mode, that the start location falls within the content display area, that the content display area includes an upper part of card content, that the sliding direction is downward, and that the lower part of the current content card falls within the second predetermined area, switching a display mode of the current content card from the browsing mode to the stacking mode.

In a possible implementation, the predetermined area includes a third predetermined area, and the determining an execution action for the content card includes: in response to that the current content card is in the browsing mode, that the start location falls within the content display area, that the content display area includes a lower part of card content, that the sliding direction is upward, and that the lower part of the current content card falls within the third predetermined area, continuously displaying content of adjacent content cards, where the continuously displaying content of adjacent content cards includes: displaying the lower part of the current content card and an upper part of a content card adjacent to the current content card.

According to a second aspect, an embodiment of the present invention provides a terminal for displaying a plurality of content cards, where the plurality of content cards include a current content card and at least one stacked content card; display modes of the plurality of content cards include a stacking mode and a browsing mode, where in the stacking mode, content of the current content card and an edge of the at least one stacked content card are displayed, and in the browsing mode, the content of the current content card is displayed in full screen; a display area of the current content card is divided into an edge area and a content display area; and the terminal includes: a detection module, configured to detect a start location and a sliding direction of finger sliding; and a processing module, configured to determine an execution action for the content card based on the display mode, a location relationship between the start location and the content display area of the current content card, the sliding direction, and a relationship between an upper part or a lower part of the current content card and a predetermined area, where the execution action includes at least one of the following: switching between the stacking mode and the browsing mode, and continuously displaying content of adjacent content cards in the browsing mode, where the adjacent content cards include the current content card and a content card that is among the at least one stacked content card and adjacent to the current content card.

In a possible implementation, the predetermined area includes a first predetermined area, and the determining an execution action for the content card by the processing module includes: in response to that the current content card is in the stacking mode, that the start location falls within the content display area, that the sliding direction is upward, and that the upper part of the current content card falls within the first predetermined area, switching from the stacking mode to the browsing mode, and translating card content upward in the content display area of the current content card.

In a possible implementation, the predetermined area includes a second predetermined area, and the determining an execution action for the content card by the processing module includes: in response to that the current content card is in the browsing mode, that the start location falls within the content display area, that the content display area includes an upper part of card content, that the sliding direction is downward, and that the lower part of the current content card falls within the second predetermined area, switching a display mode of the current content card from the browsing mode to the stacking mode.

In a possible implementation, the predetermined area includes a third predetermined area, and the determining an execution action for the content card by the processing module includes: in response to that the current content card is in the browsing mode, that the start location falls within the content display area, that the content display area includes a lower part of card content, that the sliding direction is upward, and that the lower part of the current content card falls within the third predetermined area, continuously displaying content of adjacent content cards, where the continuously displaying content of adjacent content cards includes: displaying the lower part of the current content card and an upper part of a content card adjacent to the current content card.

According to a third aspect, an embodiment of the present invention provides a terminal for displaying a plurality of content cards, including a memory, a processor, and a computer program that is stored on the memory and can run on the processor, where the plurality of content cards include a current content card and at least one stacked content card; display modes of the plurality of content cards include a stacking mode and a browsing mode, where in the stacking mode, content of the current content card and an edge of the at least one stacked content card are displayed, and in the browsing mode, the content of the current content card is displayed in full screen; a display area of the current content card is divided into an edge area and a content display area; and when executing the program, the processor implements the following: detecting a start location and a sliding direction of finger sliding; and determining an execution action for the content card based on the display mode, a location relationship between the start location and the content display area of the current content card, the sliding direction, and a relationship between an upper part or a lower part of the current content card and a predetermined area, where the execution action includes at least one of the following: switching between the stacking mode and the browsing mode, and continuously displaying content of adjacent content cards in the browsing mode, where the adjacent content cards include the current content card and a content card that is among the at least one stacked content card and adjacent to the current content card.

In a possible implementation, the predetermined area includes a first predetermined area, and the determining an execution action for the content card by the processor includes: in response to that the current content card is in the stacking mode, that the start location falls within the content display area, that the sliding direction is upward, and that the upper part of the current content card falls within the first predetermined area, switching from the stacking mode to the browsing mode, and translating card content upward in the content display area of the current content card.

In a possible implementation, the predetermined area includes a second predetermined area, and the determining an execution action for the content card by the processor includes: in response to that the current content card is in the browsing mode, that the start location falls within the content display area, that the content display area includes an upper part of card content, that the sliding direction is downward, and that the upper part of the current content card falls within the second predetermined area, switching a display mode of the current content card from the browsing mode to the stacking mode.

In a possible implementation, the predetermined area includes a third predetermined area, and the determining an execution action for the content card by the processor includes: in response to that the current content card is in the browsing mode, that the start location falls within the content display area, that the content display area includes a lower part of card content, that the sliding direction is upward, and that the lower part of the current content card falls within the third predetermined area, continuously displaying content of adjacent content cards, where the continuously displaying content of adjacent content cards includes: displaying the lower part of the current content card and an upper part of a content card adjacent to the current content card.

According to a fourth aspect, an embodiment of the present invention provides a computer storage medium, where the computer storage medium stores an instruction, and when the instruction is run on a computer, the computer is enabled to perform the method in the first aspect or any possible design of the first aspect.

According to a fifth aspect, an embodiment of the present invention provides a computer program product, where the computer program product includes an instruction, and when the product is executed by a computer, the instruction enables the computer to perform the method in the first aspect or any possible design of the first aspect.

In the embodiments of the present invention, different gestures are used, to quickly switch the stacking mode and the browsing mode of the content cards, and to quickly switch different types of cards in the browsing mode, thereby simplifying operation gestures of a user.

DESCRIPTION OF EMBODIMENTS

To make the purpose, technical solutions, and advantages of embodiments of the present invention clearer, the following clearly describes the technical solutions of the embodiments of the present invention with reference to accompanying drawings in the embodiments of the present invention.

For example, a plurality of content cards include a current content card and at least one stacked content card, and display modes of the plurality of content cards include a stacking mode and a browsing mode. In the stacking mode, content of the current content card and an edge of the at least one stacked content card are displayed. In the browsing mode, the content of the current content card is displayed in full screen. A display area of the current content card is divided into an edge area and a content display area, and the edge area includes an upper edge area and a lower edge area.

Figure 1:
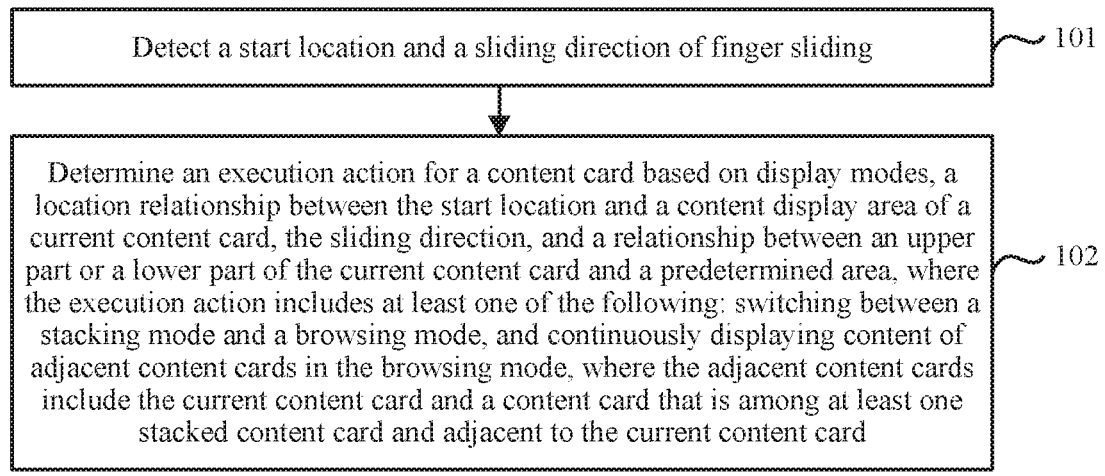
FIG. 1 is a flowchart of a method for displaying a plurality of stacked content cards on a terminal according to an embodiment of the present invention.

FIG. 1 is a flowchart of a method for displaying a plurality of stacked content cards on a terminal according to an embodiment of the present invention. As shown in FIG. 1, the method includes the following steps.

Step 101: Detect a start location and a sliding direction of finger sliding.

Step 102: Determine an execution action for a content card based on a display mode, a location relationship between the start location and a content display area of a current content card, the sliding direction, and a relationship between an upper part or a lower part of the current content card and a predetermined area, where the execution action includes at least one of the following: switching between a stacking mode and a browsing mode, and continuously displaying content of adjacent content cards in the browsing mode, where the adjacent content cards include the current content card and a content card that is among at least one stacked content card and adjacent to the current content card.

For example, in step 102, in response to that the start location falls within an edge area of the content card, the execution action for the content card is switching the current content card to a content card that is among the at least one stacked content card and adjacent to the current content card.

Further, for example, in step 102, in response to that the start location falls within an upper edge area and the sliding direction is downward, the execution action for the content card is switching the current content card to a previous content card among the at least one stacked content card.

Figure 2:
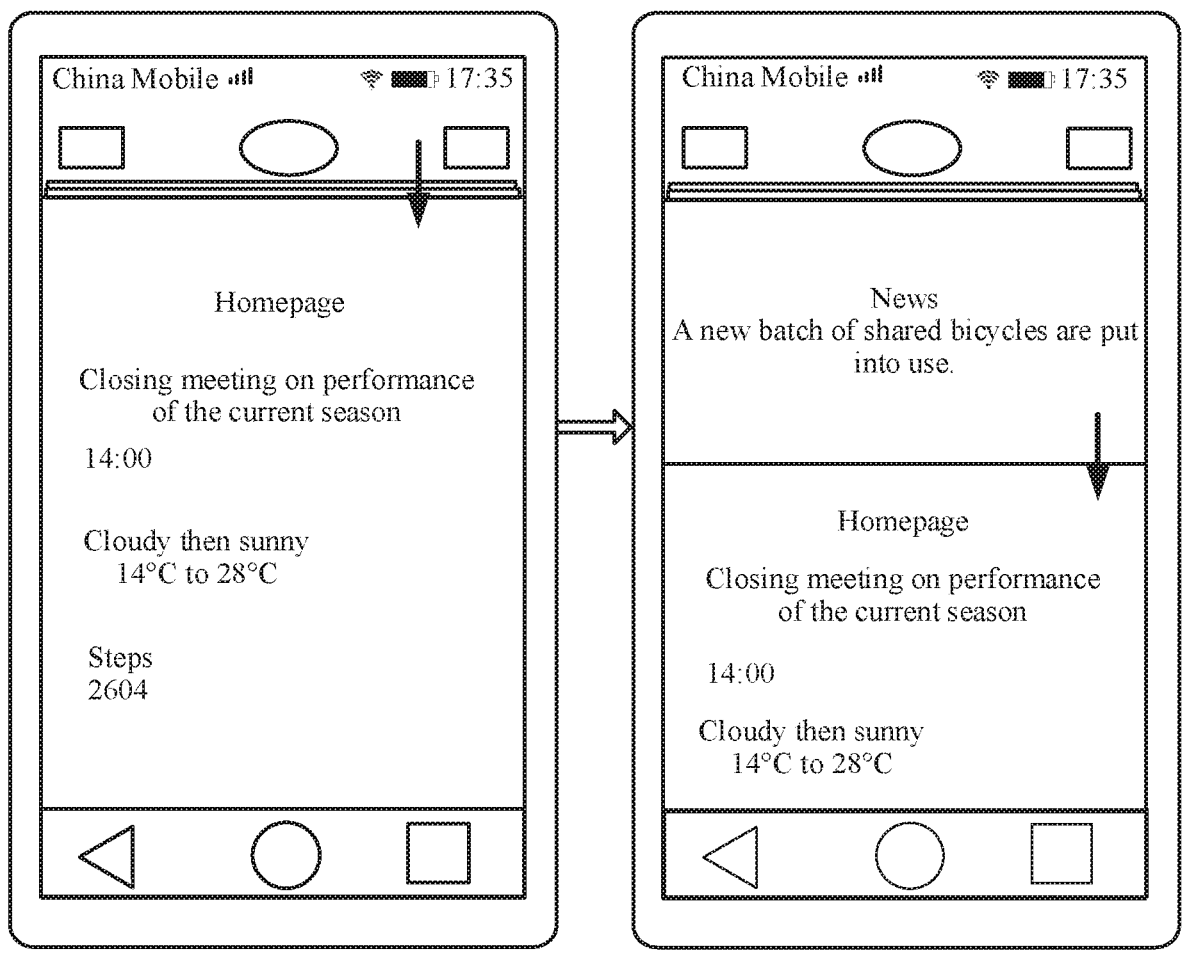
FIG. 2 is a schematic diagram of a method for switching content cards on a terminal according to an embodiment of the present invention.

FIG. 2 is a schematic diagram of a method for switching content cards on a terminal according to an embodiment of the present invention.

For example, as shown in FIG. 2, in step 102, the current content card is in the stacking mode, a title is "homepage", the start location of finger sliding falls within the upper edge area, and the sliding direction is downward. In this case, the execution action for the content card is switching to an adjacent previous content card whose title is "news".

Figure 3:
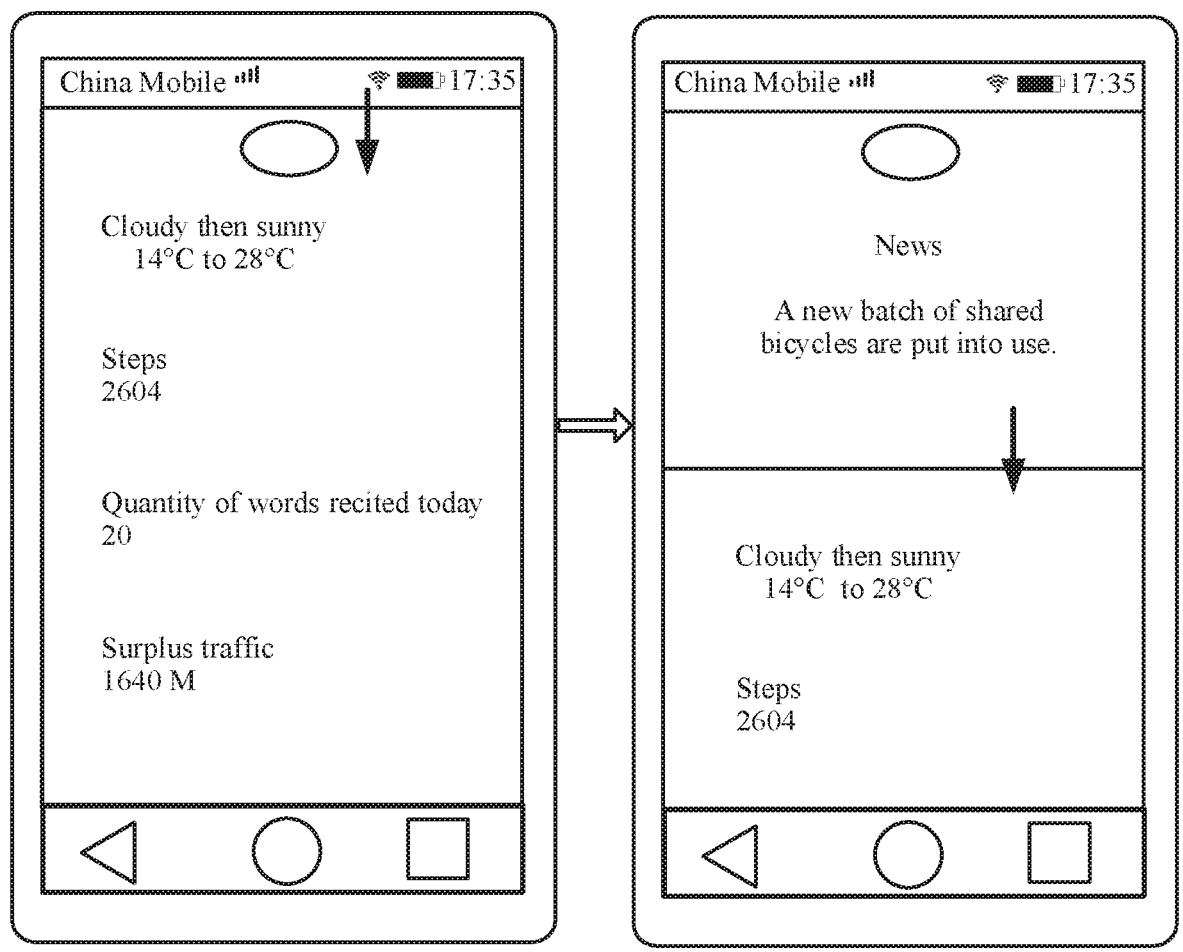
FIG. 3 is a schematic diagram of another method for switching content cards on a terminal according to an embodiment of the present invention.

FIG. 3 is a schematic diagram of another method for switching content cards on a terminal according to an embodiment of the present invention.

For example, as shown in FIG. 3, in step 102, the current content card is in the browsing mode, the start location of finger sliding falls within the upper edge area, and the sliding direction is downward. In this case, the execution action for the content card is switching to an adjacent previous content card whose title is "news".

In another aspect, for example, in step 102, in response to that the start location falls within a lower edge area and the sliding direction is upward, the current content card is switched to a next content card among the at least one stacked content card.

Figure 4:
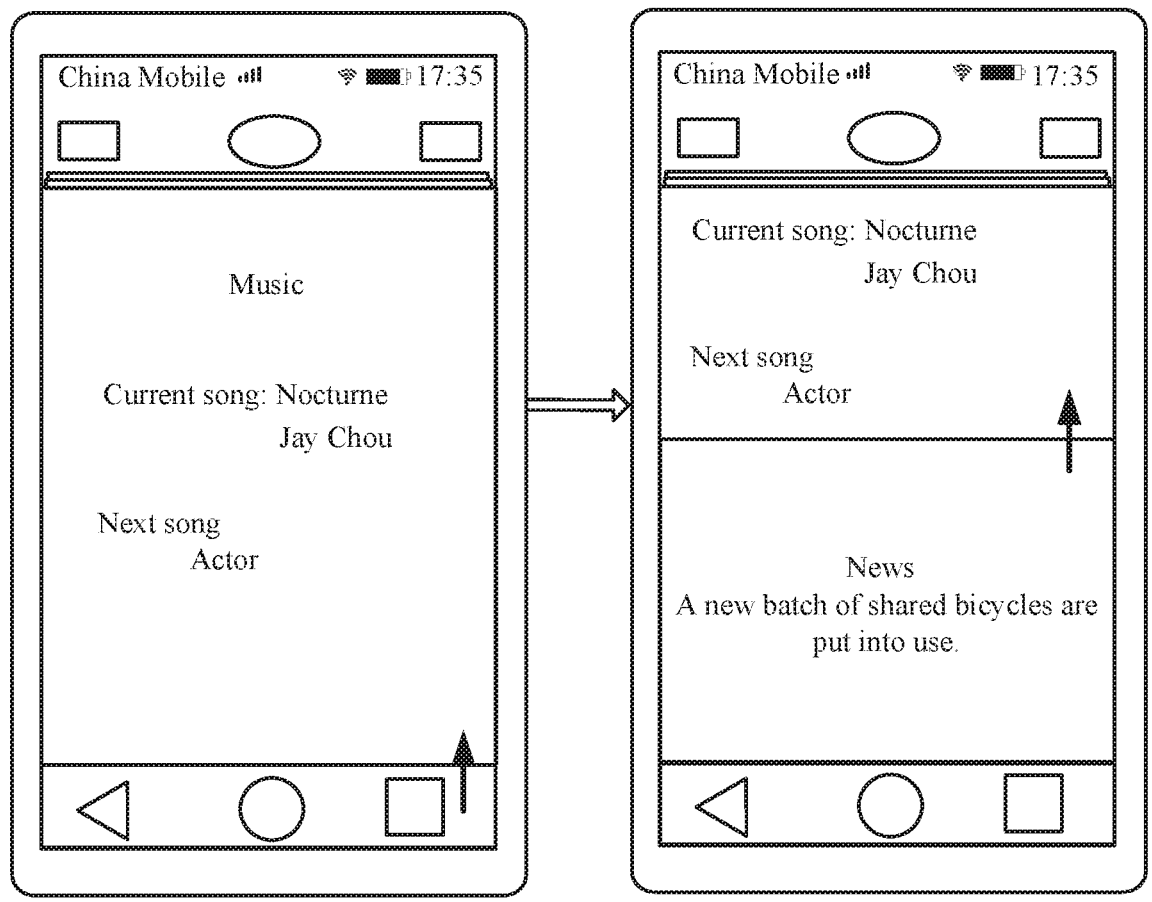
FIG. 4 is a schematic diagram of another method for switching content cards on a terminal according to an embodiment of the present invention.

FIG. 4 is a schematic diagram of another method for switching content cards on a terminal according to an embodiment of the present invention.

For example, as shown in FIG. 4, in step 102, the current content card is in the stacking anode, a title is "music", the start location of finger sliding falls within the lower edge area of the card, and the sliding direction is upward. In this case, the execution action for the content card is switching to an adjacent next content card whose title is "news".

Figure 5:
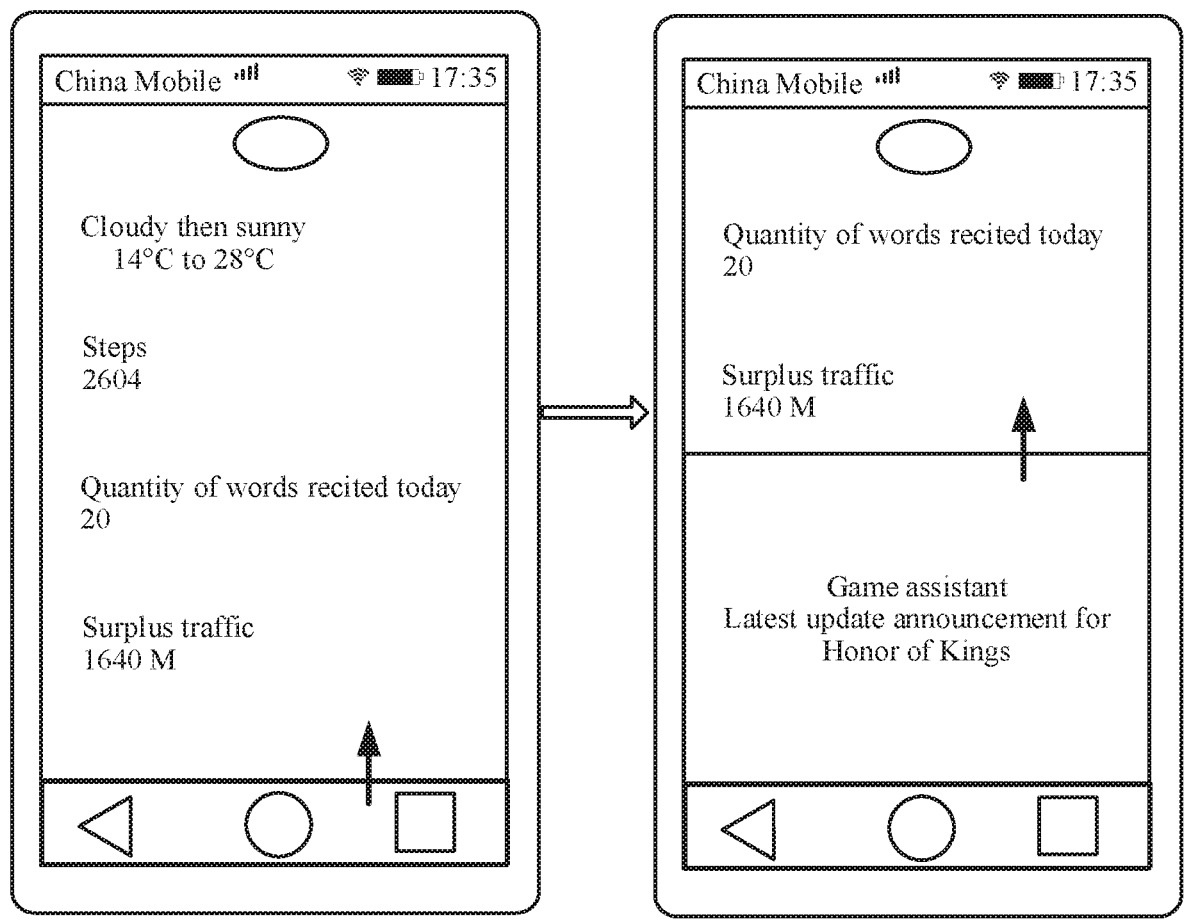
FIG. 5 is a schematic diagram of another method for switching content cards on a terminal according to an embodiment of the present invention.

FIG. 5 is a schematic diagram of another method for switching content cards on a terminal according to an embodiment of the present invention.

For example, as shown in FIG. 5, in step 102, the current content card is in the browsing mode, the start location of finger sliding falls within the lower edge area of the card, and the sliding direction is upward. In this case, the execution action for the content card is switching to an adjacent next content card whose title is "game assistant".

For example, in step 102, the predetermined area includes a first predetermined area, and in response to that the current content card is in the stacking mode, that the start location falls within the content display area, that the sliding direction is upward, and that the upper part of the current content card falls within the first predetermined area, the stacking mode is switched to the browsing mode, and card content is translated upward in the content display area of the current content card.

Figure 6:
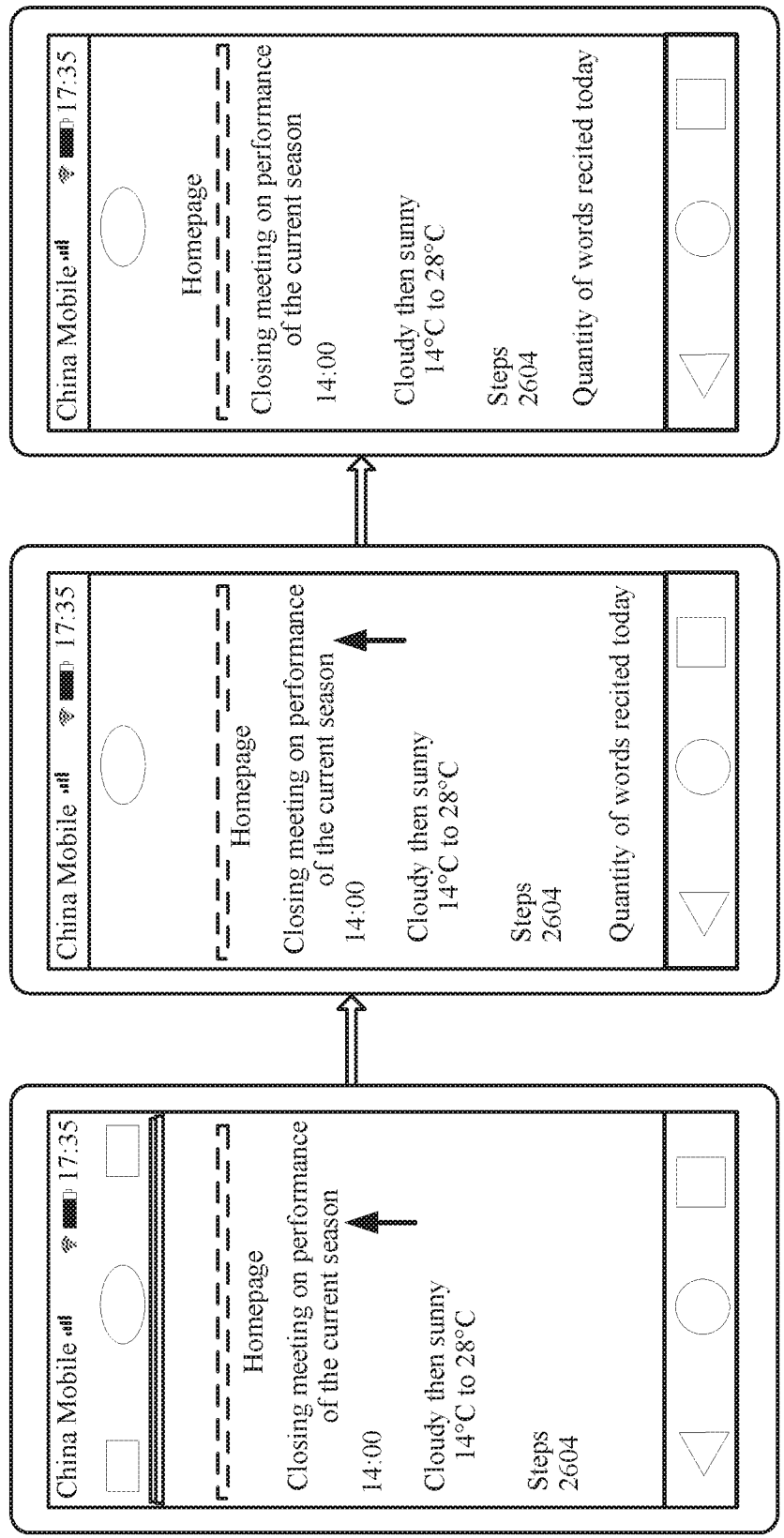
FIG. 6 is a schematic diagram of a method for switching display modes of content cards on a terminal according to an embodiment of the present invention.

FIG. 6 is a schematic diagram of a method for switching display modes of content cards on a terminal according to an embodiment of the present invention.

For example, as shown in FIG. 6, the first predetermined area is an area shown by a dashed line box, and the upper part is a head of a title "homepage". In step 102, the current content card is a content card whose title is "homepage", the card is in the stacking mode, the start location of finger sliding is in the content display area of the card, and the sliding direction is upward, so that the head of the title "homepage" of the card enters the area shown by the dashed line box. In this case, the card is switched from the stacking mode to the browsing mode, the card content is translated upward in the content display area of the current content card, and a user may continue to browse downward while switching to the browsing mode.

For example, in step 102, in response to that the current content card is in the stacking mode, that the start location falls within the content display area, and that the sliding direction is downward, the current content card is switched to a previous content card among the at least one stacked content card.

Figure 7:
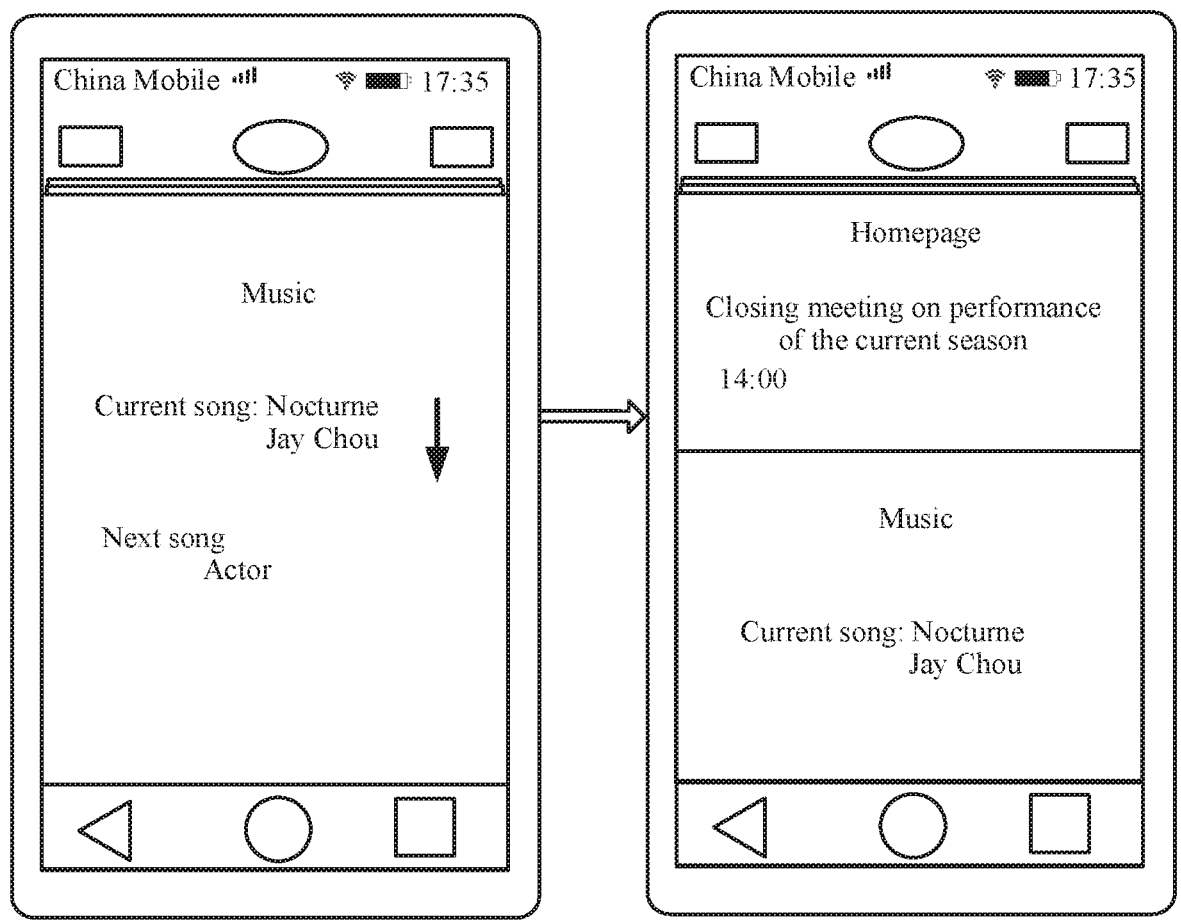
FIG. 7 is a schematic diagram of another method for switching content cards on a terminal according to an embodiment of the present invention.

FIG. 7 is a schematic diagram of another method for switching content cards on a terminal according to an embodiment of the present invention.

For example, as shown in FIG. 7, in step 102, the current content card is a content card whose title is "music", the card is in the stacking mode, the start location of finger sliding is in the content display area of the card, and the sliding direction is downward. In this case, the current content card is switched to the previous content card among the at least one stacked content card, that is, a content card whose title is "homepage".

For example, in step 102, in response to that the current content card is in the browsing mode, that the start location falls within the content display area, and that the content display area does not include an end part of card content, the card content is translated in the content display area of the current content card.

Further, for example, in step 102, the determining an execution action for the card includes:

in response to that the current content card is in the browsing mode, that the start location falls within the content display area, that the content display area does not include an end part of card content, and that the sliding direction is upward, translating the card content upward in the content display area of the current content card.

Figure 8:
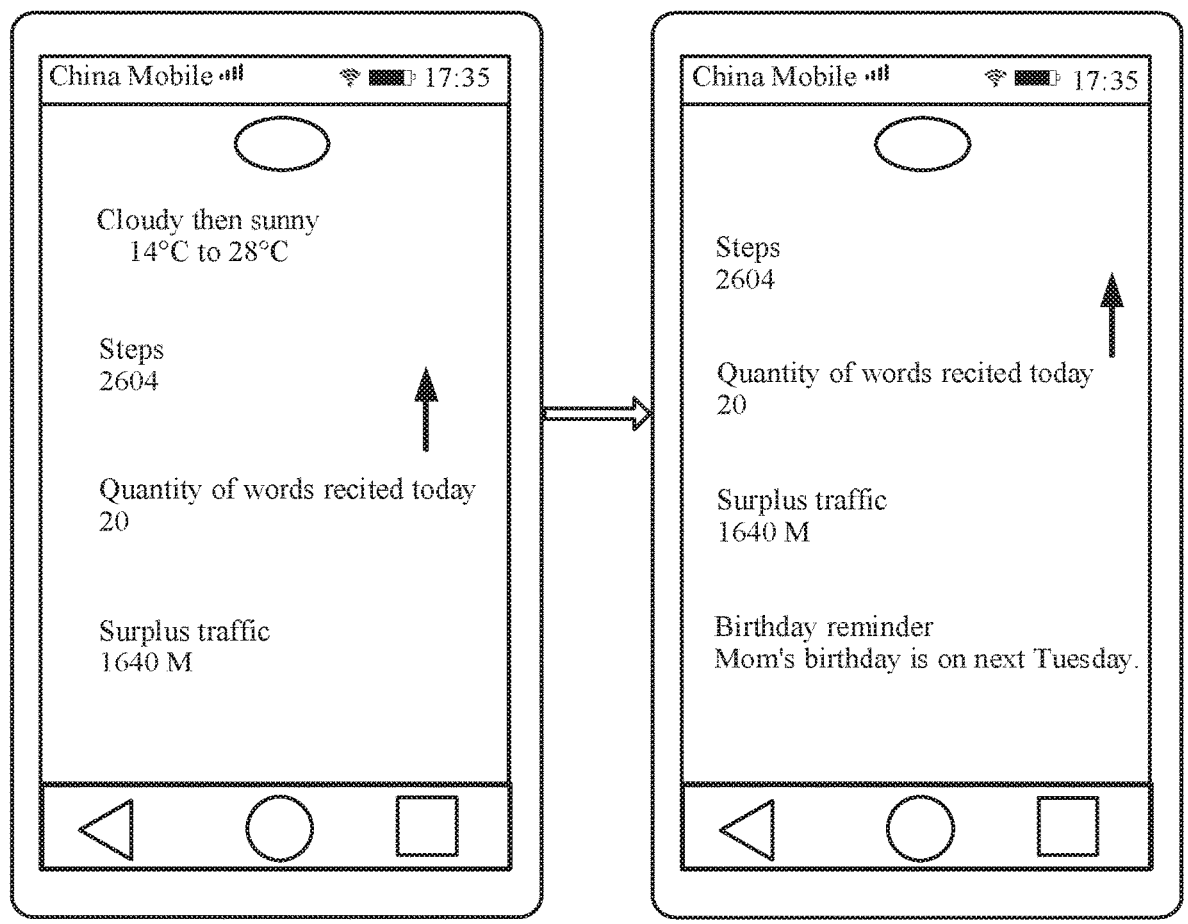
FIG. 8 is a schematic diagram of a method for browsing content cards on a terminal according to an embodiment of the present invention.

FIG. 8 is a schematic diagram of a method for browsing content cards on a terminal according to an embodiment of the present invention.

For example, as shown in FIG. 8, in step 102, the current content card is in the browsing mode, the content display area does not include an end part of card content, the start location falls within the content display area, and the sliding direction is upward. In this case, the card content is translated upward in the content display area of the current content card, and a user may continue to browse a "birthday reminder" part downward.

Further, for example, in step 102, the determining an execution action for the card includes:

in response to that the current content card is in the browsing mode, that the start location falls within the content display area, that the content display area does not include an end part of card content, and that the sliding direction is downward, translating the card content downward in the content display area of the current content card.

Figure 9:
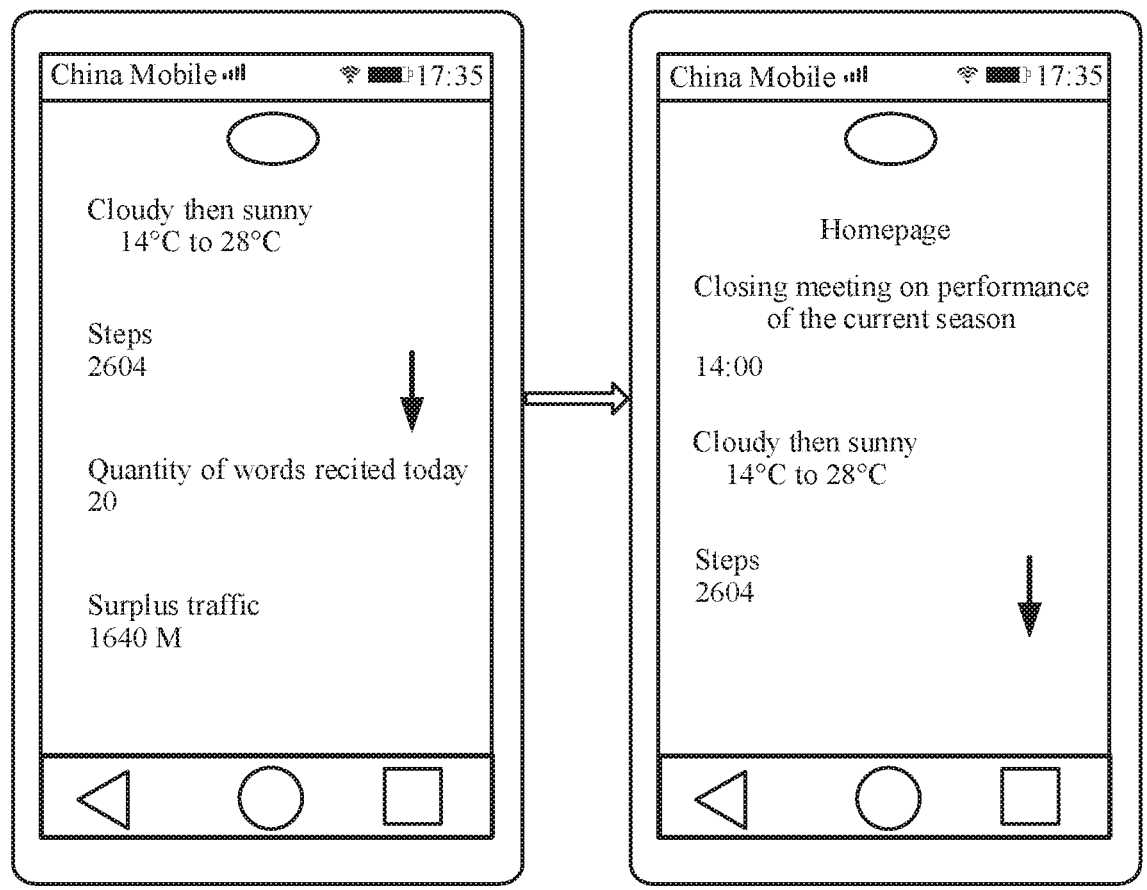
FIG. 9 is a schematic diagram of another method for browsing content cards on a terminal according to an embodiment of the present invention.

FIG. 9 is a schematic diagram of another method for browsing content cards on a terminal according to an embodiment of the present invention.

For example, as shown in FIG. 9, in step 102, the current content card is in the browsing mode, the content display area does not include an end part of card content, the start location falls within the content display area, and the sliding direction is downward. In this case, the card content is translated downward in the content display area of the current content card, and a user may continue to browse a "closing meeting" part upward.

For example, in step 102, the predetermined area includes a second predetermined area, and in response to that the current content card is in the browsing mode, that the start location falls within the content display area, that the sliding direction is downward, the content display area includes an upper part of card content, and that the upper part of the current content card falls within the second predetermined area, the display mode of the current content card is switched from the browsing mode to the stacking mode. The upper part of the content card usually has a title. It should be noted that the first predetermined area and the second predetermined area are not a same area.

Figure 10:
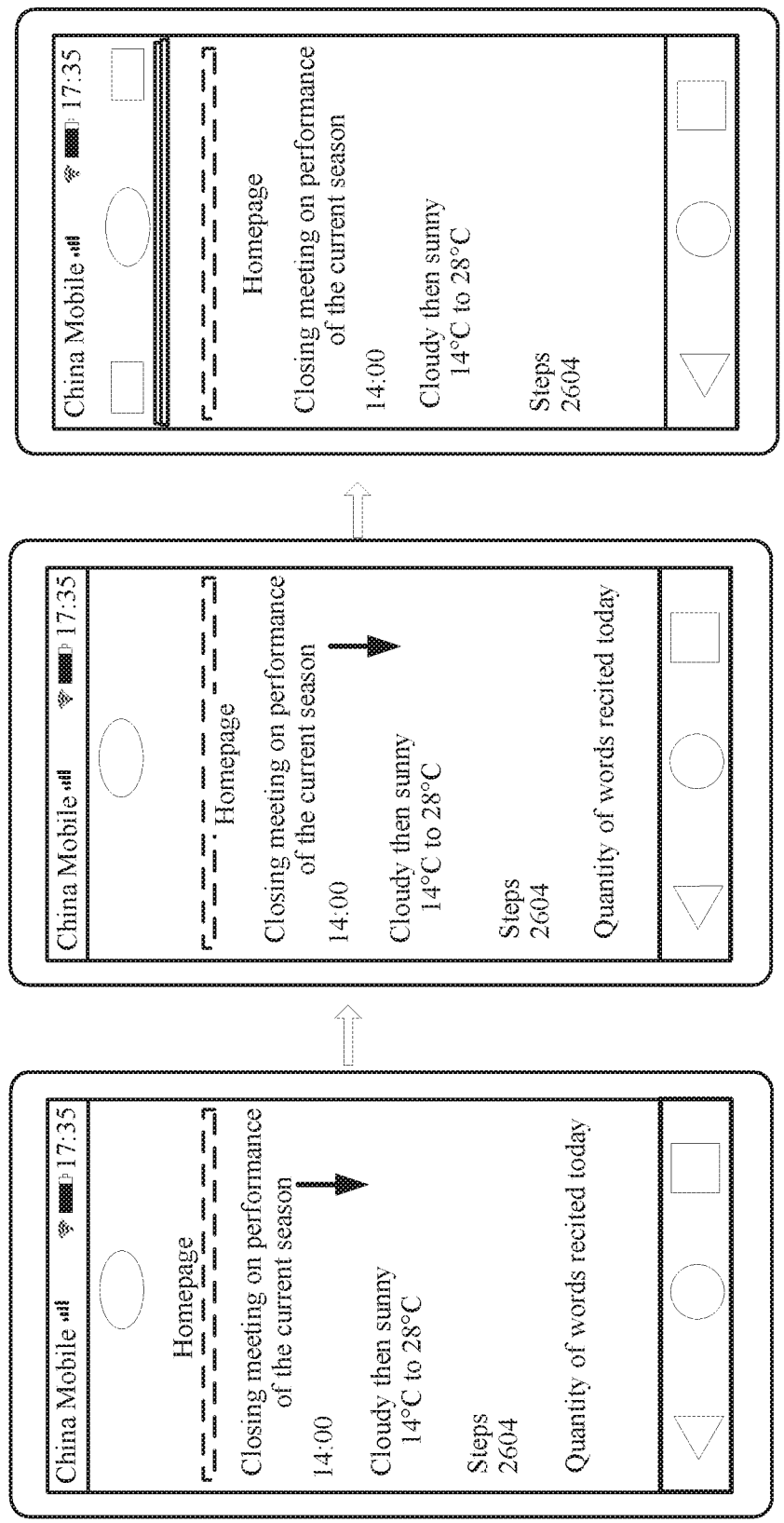
FIG. 10 is a schematic diagram of another method for switching display modes of content cards on a terminal according to an embodiment of the present invention.

FIG. 10 is a schematic diagram of another method for switching display modes of content cards on a terminal according to an embodiment of the present invention.

For example, as shown in FIG. 10, the second predetermined area is an area shown by a dashed line box, and the upper part is a head of a title "homepage". In step 102, the current content card is in the browsing mode, a title is "homepage", a head of the title "homepage" is displayed in the current content display area, indicating that a currently displayed screen already includes the upper part of the card content, namely, a start end of the content, the start location of finger sliding falls within the content display area, and the sliding direction is downward, so that the head of the title "homepage" of the card enters the area shown by the dashed line box. In this case, the execution action for the content card is switching the browsing mode back to the stacking mode.

For example, in step 102, the predetermined area includes a third predetermined area, and in response to that the current content card is in the browsing mode, that the start location falls within the content display area, that the sliding direction is upward, the content display area includes a lower part of card content, and that the lower part of the current content card falls within the third predetermined area, content of adjacent content cards is continuously displayed, Where the continuously displaying content of adjacent content cards includes: displaying the lower part of the current content card and an upper part of a content card adjacent to the current content card. The lower part of the content card includes a word or a pattern that indicates an end, such as "end". It should be noted that the first predetermined area, the second predetermined area, and the third predetermined area are not a same area.

Figure 11:
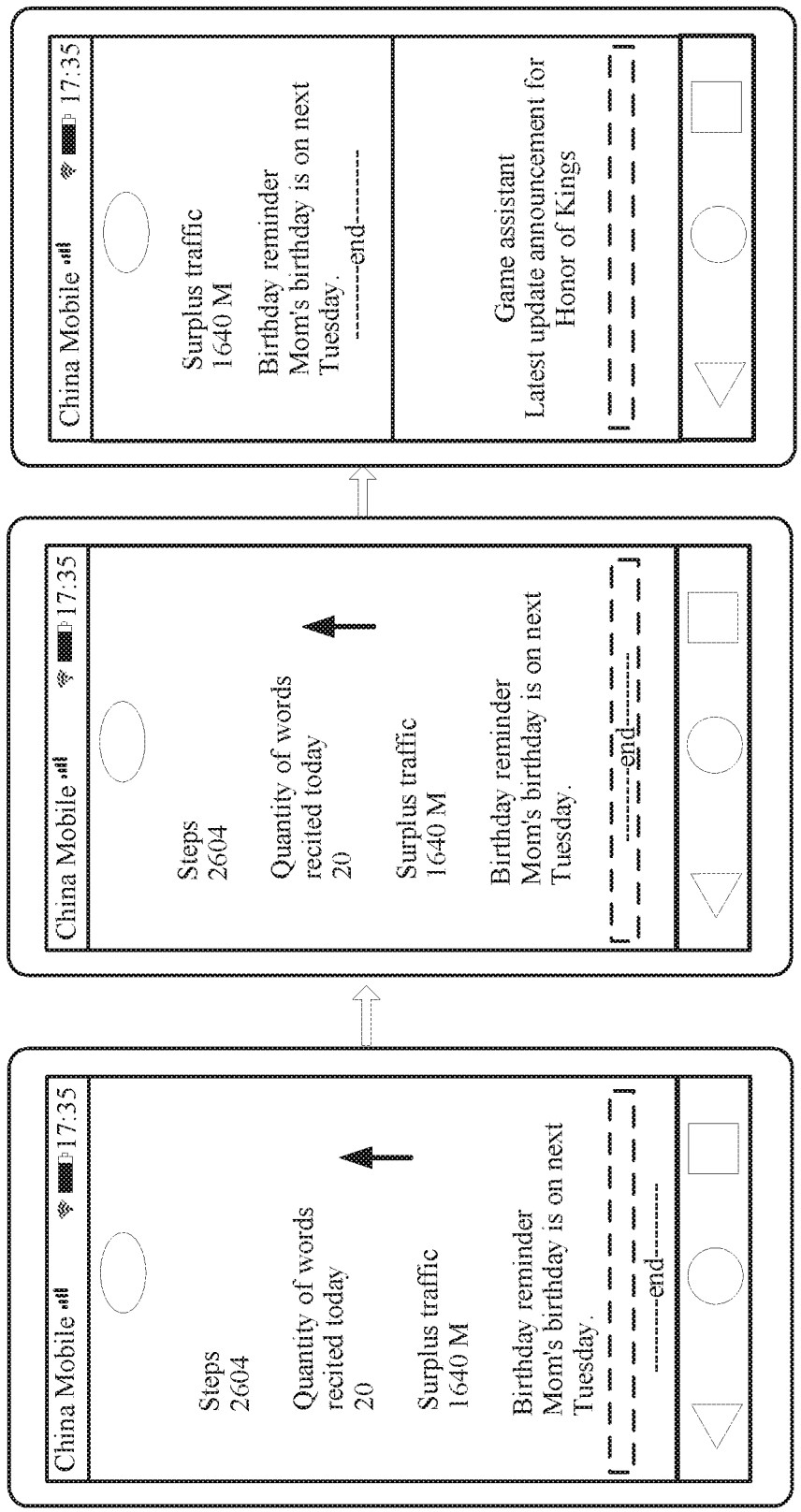
FIG. 11 is a schematic diagram of another method for switching content cards on a terminal according to an embodiment of the present invention.

FIG. 11 is a schematic diagram of another method for switching content cards on a terminal according to an embodiment of the present invention.

For example, as shown in FIG. 11, the third predetermined area is an area shown by a dashed line box, and the lower part of the current content card is a title word "end". In step 102, the current content card is in the browsing mode, a title is "homepage", the word "end" is displayed in the current content display area, indicating that a currently displayed screen already includes the lower part of the card content, namely, an end part of the content, the start location of finger sliding falls within the content display area, and the sliding direction is upward, so that the word "end" of the card enters the area shown by the dashed line box. In this case, the execution action for the content card is continuously displaying content of adjacent content cards, to be specific, displaying a traffic reminder part and a birthday reminder part at the end of a card on the top and a game assistant part at the beginning of a next content card.

It should be noted that, in the embodiments shown in FIG. 6, FIG. 10, and FIG. 11, the first predetermined area, the second predetermined area, and the third predetermined area are not a same area. Division of the three areas is to ensure that corresponding sliding reaches a specific location or a specific degree, so that a mobile phone can distinguish a specified action from a false touch operation with a relatively small sliding amplitude.

For example, in this method, a resetting area is further preset on a screen of the mobile phone, a tapping location of a finger is detected, and the determining an execution action for the content card further includes: in response to that the tapping location falls within the preset resetting area and that the current content card is in the stacking mode, switching the current content card to a predetermined content card in the plurality of content cards.

For example, in any stacking mode in FIG. 2, FIG. 4, FIG. 6, FIG. 7, or FIG. 10, an elliptical area in the figure is the resetting area, and the elliptical area in the figure is tapped to switch from the current content card to a predetermined content card, for example, a content card whose title is "homepage".

For example, in this method, a resetting area is further set on a screen of the mobile phone, a tapping location of a finger is detected, and the determining an execution action for the content card further includes: in response to that the tapping location falls within the preset resetting area and that the current content card is in the browsing mode, switching from the browsing mode to the stacking mode.

For example, in any browsing mode shown in FIG. 3, FIG. 5, FIG. 6, and FIG. 8 to FIG. 11, an elliptical area in the figure is the resetting area, and the elliptical area in the figure is tapped to switch the current content card to the stacking mode.

An embodiment of the present invention further provides a terminal for displaying a plurality of stacked content cards. For example, the plurality of content cards include a current content card and at least one stacked content card. A display area of the current content card is divided into an edge area and a content display area, and the edge area includes an upper edge area and a lower edge area.

Figure 12:
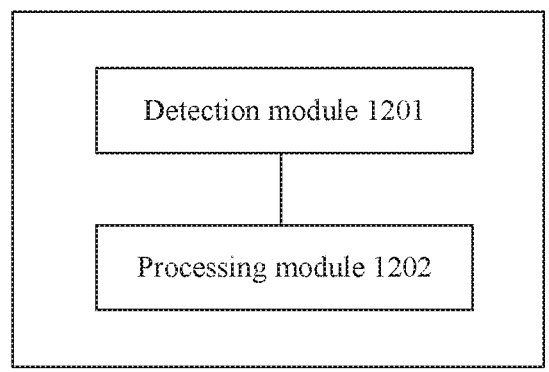
FIG. 12 is a schematic structural diagram of a terminal for displaying a plurality of content cards according to an embodiment of the present invention.

FIG. 12 is a schematic structural diagram of a terminal for displaying a plurality of content cards according to an embodiment of the present invention. As shown in FIG. 12, the terminal includes: a detection module 1201, configured to detect a start location and a sliding direction of finger sliding; and a processing module 1202, configured to determine an execution action for a content card based on a display mode, a location relationship between the start location and a content display area of a current content card, the sliding direction, and a relationship between an upper part or a lower part of the current content card and a predetermined area, where the execution action includes at least one of the following: switching between a stacking mode and a browsing mode, and continuously displaying content of adjacent content cards in the browsing mode, where the adjacent content cards include the current content card and a content card that is among at least one stacked content card and adjacent to the current content card.

For example, in response to that the start location falls within an edge area of the content card, the execution action for the content card that is performed by the processing module is switching the current content card to a content card that is among the at least one stacked content card and adjacent to the current content card.

Further, for example, the determining an execution action for the card by the processing module includes:
in response to the start location falls within an upper edge area and that the sliding direction is downward, the execution action for the card is switching the current content card to a previous content card among the at least one stacked content card.

For example, as shown in FIG. 2, the current content card is in the stacking mode, a title is "homepage", the start location of finger sliding falls within the upper edge area, and the sliding direction is downward. In this case, the execution action for the content card is switching to an adjacent previous content card whose title is "news".

For example, as shown in FIG. 3, the current content card is in the browsing mode, the start location of finger sliding falls within the upper edge area, and the sliding direction is downward. In this case, the execution action for the content card is switching to an adjacent previous content card whose title is "news".

In another aspect, for example, in response to that the start location falls within a lower edge area and the sliding direction is upward, the current content card is switched to a next content card among the at least one stacked content card.

For example, as shown in FIG. 4, in step 102, the current content card is in the stacking mode, a title is "music", the start location of finger sliding falls within the lower edge area of the card, and the sliding direction is upward. In this case, the execution action for the content card is switching to an adjacent next content card whose title is "news".

For example, as shown in FIG. 5, in step 102, the current content card is in the browsing mode, the start location of finger sliding falls within the lower edge area of the card, and the sliding direction is upward. In this case, the execution action for the content card is switching to an adjacent next content card whose title is "game assistant".

For example, the predetermined area includes a first predetermined area, and the determining an execution action for a card by the processing module includes: in response to that the current content card is in the stacking mode, that the start location falls within the content display area, that the sliding direction is upward, and that the upper part of the current content card falls within the first predetermined area, switching from the stacking mode to the browsing mode, and translating card content upward in the content display area of the current content card.

For example, as shown in FIG. 6, the first predetermined area is an area shown by a dashed line box, and the upper part is a head of a title "homepage". The current content card is a content card whose title is "homepage", the card is in the stacking mode, the start location of finger sliding is in the content display area of the card, and the sliding direction is upward, so that the head of the title "homepage" of the card enters the area shown by the dashed line box. In this case, the card is switched from the stacking mode to the browsing mode, the card content is translated upward in the content display area of the current content card, and a user may continue to browse downward while switching to the browsing mode.

For example, the determining an execution action for a card by the processing module includes: in response to that the current content card is in the stacking mode, that the start location falls within the content display area, and that the sliding direction is downward, switching the current content card to a previous content card among the at least one stacked content card.

For example, as shown in FIG. 7, the current content card is a content card whose title is "music", the card is in the stacking mode, the start location of finger sliding is in the content display area of the card, and the sliding direction is downward. In this case, the current content card is switched to the previous content card among the at least one stacked content card, that is, a content card whose title is "homepage".

For example, the determining an execution action for a card by the processing module includes: in response to that the current content card is in the browsing mode, that the start location falls within the content display area, and that the content display area does not include an end part of card content, translating the card content in the content display area of the current content card.

Further, for example, the determining an execution action for a card by the processing module includes: in response to that the current content card is in the browsing mode, that the start location falls within the content display area, that the content display area does not include an end part of card content, and that the sliding direction is upward, translating the card content upward in the content display area of the current content card.

For example, as shown in FIG. 8, in step 102, the current content card is in the browsing mode, the content display area does not include an end part of card content, the start location falls within the content display area, and the sliding direction is upward. In this case, the card content is translated upward in the content display area of the current content card, and a user may continue to browse a "birthday reminder" part downward.

Further, the determining an execution action for a card by the processing module includes: in response to that the current content card is in the browsing mode, that the start location falls within the content display area, that the content display area does not include an end part of card content, and that the sliding direction is downward, translating the card content downward in the content display area of the current content card.

For example, as shown in FIG. 9, the current content card is in the browsing mode, the content display area does not include an end part of card content, the start location falls within the content display area, and the sliding direction is downward. In this case, the card content is translated downward in the content display area of the current content card, and a user may continue to browse a "closing meeting" part upward.

For example, the predetermined area includes a second predetermined area, and the determining an execution action for a card by the processing module includes: in response to that the current content card is in the browsing mode, that the start location falls within the content display area, that the sliding direction is downward, that the content display area includes an upper part of card content, and that the upper part of the current content card falls within the second predetermined area, switching the display mode of the current content card from the browsing mode to the stacking mode. The upper part of the content card usually has a title. It should be noted that the first predetermined area and the second predetermined area are not a same area.

For example, as shown in FIG. 10, the second predetermined area is an area shown by a dashed line box, and the upper part is a head of a title "homepage". In step 102, the current content card is in the browsing mode, a title is "homepage", a head of the title "homepage" is displayed in the current content display area, indicating that a currently displayed screen already includes the upper part of the card content, namely, a start end of the content, the start location of finger sliding falls within the content display area, and the sliding direction is downward, so that the head of the title "homepage" of the card enters the area shown by the dashed line box. In this case, the execution action for the content card is switching the browsing mode back to the stacking mode.

For example, the predetermined area includes a third predetermined area, and the determining an execution action for a card by the processing module includes: in response to that the current content card is in the browsing mode, that the start location falls within the content display area, that the sliding direction is upward, that the content display area includes a lower part of card content, and that the lower part of the current content card falls within the third predetermined area, continuously displaying content of adjacent content cards, where the continuously displaying content of adjacent content cards includes: displaying the lower part of the current content card and an upper part of a content card adjacent to the current content card. The lower part of the content card includes a word or a pattern that indicates an end, such as "end". It should be noted that the first predetermined area, the second predetermined area, and the third predetermined area are not a same area.

For example, as shown in FIG. 11, the third predetermined area is an area shown by a dashed line box, and the lower part of the current content card is a title word "end". The current content card is in the browsing mode, a title is "homepage", the word "end" is displayed in the current content display area, indicating that a currently displayed screen already includes the lower part of the card content, namely, an end part of the content, the start location of finger sliding falls within the content display area, and the sliding direction is upward, so that the word "end" of the card enters the area shown by the dashed line box. In this case, the execution action for the content card is continuously displaying content of adjacent content cards, to be specific, displaying a traffic reminder part and a birthday reminder part at the end of a card on the top and a game assistant part at the beginning of a next content card.

It should be noted that, in the embodiments shown in FIG. 6, FIG. 10, and FIG. 11, the first predetermined area, the second predetermined area, and the third predetermined area are not a same area. Division of the three areas is to ensure that corresponding sliding reaches a specific location or a specific degree, so that a mobile phone can distinguish a specified action from a false touch operation with a relatively small sliding amplitude.

For example, a resetting area is further preset on a screen of a mobile phone, the detection module 1201 detects a tapping location of a finger, and the determining an execution action for a card by the processing module further includes: in response to that the tapping location falls within the preset resetting area and that the current content card is in the stacking mode, switching the current content card to a predetermined content card in the plurality of content cards.

For example, in any stacking mode in FIG. 2, FIG. 4, FIG. 6, FIG. 7, or FIG. 10, an elliptical area in the figure is the resetting area, and the elliptical area in the figure is tapped to switch from the current content card to a predetermined content card, for example, a content card whose title is "homepage".

For example, a resetting area is further preset on a screen of a mobile phone, the detection module 1201 detects a tapping location of a finger, and the determining an execution action for a content card by the processing module further includes: in response to that the tapping location falls within the preset resetting area and that the current content card is in the browsing mode, switching from the browsing mode to the stacking mode.

For example, in any browsing mode shown in FIG. 3, FIG. 5, FIG. 6, and FIG. 8 to FIG. 11, an elliptical area in the figure is the resetting area, and the elliptical area in the figure is tapped to switch the current content card to the stacking mode.

The method disclosed in the embodiments of the present invention may be applied to a plurality of terminals.

Figure 13:
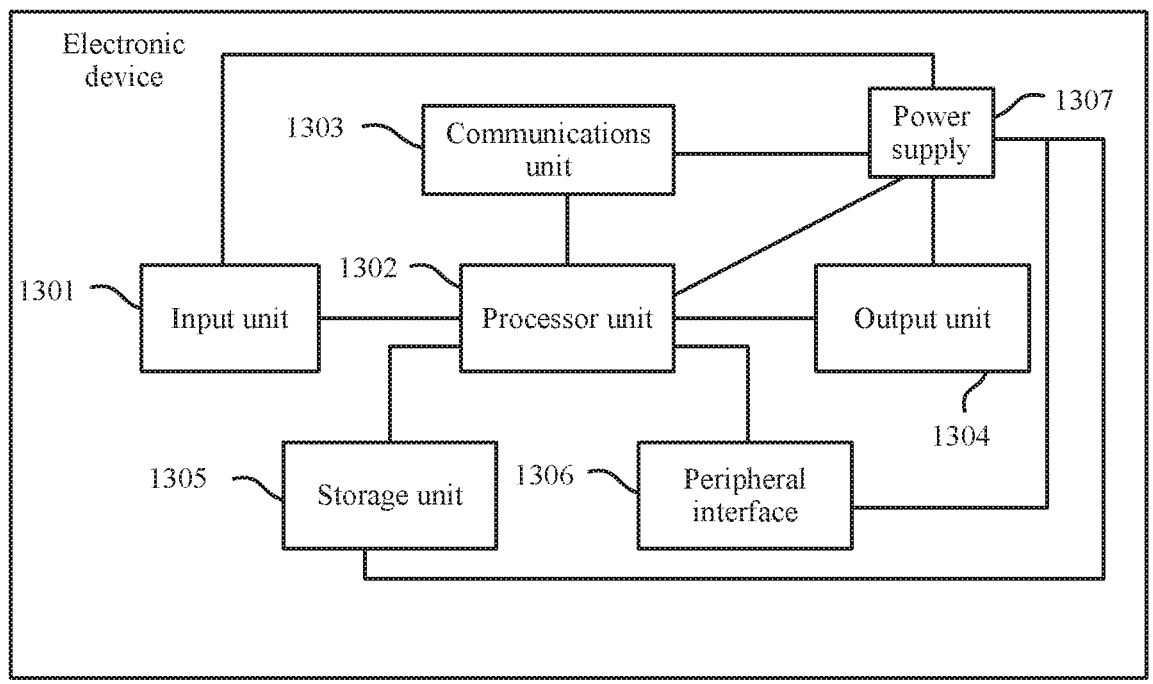
FIG. 13 is a schematic structural diagram of a terminal according to an embodiment of the present invention.

FIG. 13 is a schematic structural diagram of a terminal according to an embodiment of the present invention. The terminal is configured to implement the method recorded in the foregoing method embodiments.

The terminal in this embodiment of the present invention may be a mobile phone. A mobile phone is used as an example. As shown in FIG. 13, an electronic device in this embodiment of the present invention includes the following parts: an input unit 1301, a processor unit 1302, a communications unit 1303, an output unit 1304, a storage unit 1305, a peripheral interface 1306, and a power supply 1307. In this embodiment of the present invention, both the input unit 1301 and the output unit 1304 are touch panels, the processor unit 1302 is a processor and may be one or more mobile phone chips, and the storage unit 1305 is a memory.

The input unit 1301 is configured to implement interaction between a user and the terminal and/or input information to the terminal. For example, the input unit 1301 may receive digit or character information entered by the user, to generate signal input related to user setting or function control. In a specific implementation of this embodiment of the present invention, the input unit 1301 may be a touch panel, may be another man-machine interaction interface, such as a substantive input key or a microphone, or may be another external information obtaining apparatus, such as a camera. The touch panel, also referred to as a touchscreen, may collect operation actions of the user touching or approaching the touch panel. For example, the user performs an operation action on the touch panel or at a position near the touch panel by using any appropriate object or accessory such as a finger or a stylus, and a corresponding connection apparatus is driven based on a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor unit 1302. The touch controller may further receive and execute a command sent by the processing unit. In addition, the touch panel may be implemented in a plurality of types, such as a resistive type, a capacitive type, infrared, and a surface acoustic wave. In another implementation of this embodiment of the present invention, the substantive input key used by the input unit 1301 may include but is not limited to one or more of a physical keyboard, a function key (for example, a volume control key or an on/off key), a trackball, a mouse, a joystick, and the like. The input unit 1301 in a microphone form may collect a voice that is input by the user or an environment, and convert the voice into a command that is in an electrical signal form and that can be executed by the processor unit.

In some other implementations of this embodiment of the present invention, the input unit 1301 may alternatively be various sensing components, such as a Hall component configured to detect a physical quantity of the terminal, for example, force, torque, pressure, stress, a location, a displacement, a speed, an acceleration, an angle, an angular velocity, a rotation quantity, a rotational speed, and duration in which a working status changes, and converts the physical quantity into an electric quantity for detection and control. Some other sensing components may further include a gravity sensor, a tri-axis accelerometer, a gyroscope, and the like.

The processor unit 1302, as a control center of the terminal, is connected to various parts of the entire terminal by using various interfaces and lines, and implements various functions of the terminal and/or processes data by running or executing a software program and/or module stored in the storage unit 1305 and invoking data stored in the storage unit 1305. The processor unit 1302 may include an integrated circuit. For example, the processor unit may include a single packaged integrated circuit, or may be formed by connecting a plurality of packaged integrated circuits with a same function or different functions. For example, the processor unit 1302 may include only a central processing unit, or may be a combination of a graphics processing unit (GPU), a digital signal processor, and a control chip (for example, a baseband chip) in the communications unit 1303. In an implementation of this embodiment of the present invention, the central processing unit may be a single computing core, or may include a plurality of computing cores.

The communications unit 1303 is configured to establish a communications channel, so that the terminal is connected to a remote server through the communications channel, and downloads media data from the remote server. The communications unit 1303 may include a communications module such as a wireless local area network module, a BLUETOOTH module, or a baseband module, and a radio frequency circuit corresponding to the communications module, and is configured to perform wireless local area network communication, BLUETOOTH communication, infrared communication and/or cellular communications system communication, such as wideband code division multiple access (WCDMA) and/or high speed downlink packet access (HSDPA). The communications module is configured to control communication between components in the terminal, and may support direct memory access.

In different implementations of this embodiment of the present invention, each communications module in the communications unit usually is in a form of an integrated circuit chip, and may be selectively combined and does not need to include all communications modules and corresponding antenna groups. For example, the communications unit may include only a baseband chip, a radio frequency chip, and a corresponding antenna, to provide a communication function in a cellular communications system. The terminal may be connected to a cellular network or the Internet by using a wireless communications connection established by the communications unit, for example, wireless local area network access or WCDMA access. In some optional implementations of this embodiment of the present invention, the communications module in the communications unit, for example, a baseband module, may be integrated into the processor unit. The processor unit is typically an APQ+ MDM series of platforms provided by Qualcomm.

The radio frequency circuit is configured to send and receive information or send and receive a signal during a call. For example, after receiving downlink information of a base station, the downlink information is processed by the processor unit 1302. In addition, designed uplink data is sent to the base station. Generally, the radio frequency circuit includes a public circuit configured to execute these functions, and includes but is not limited to an antenna system, a radio frequency transceiver, one or more amplifiers, a tuner, one or more oscillators, a digital signal processor, a codec chip set, a subscriber identity module card, a memory, and the like. In addition, the radio frequency circuit may further communicate with a network and another device through wireless communication. Any communications standard or protocol may be used for the wireless communication, including but not limited to a global system for mobile communications (GSM), a general packet radio service (GPRS), code division multiple access (CDMA), WCDMA, a high speed uplink packet access (HSUPA) technology, long term evolution (LTE), an email, a short message service (SMS), and the like.

The output unit 1304 includes but is not limited to an image output unit and a voice output unit. The image output unit is configured to output a text, an image, and/or a video. The image output unit may include a display panel, for example, a display panel configured in a form of a liquid crystal display (LCD), an organic light-emitting diode (OLED), or a field emission display (FED). Alternatively, the image output unit may include a reflective display, for example, an electrophoretic display, or a display using an interferometric modulation of light technology. The image output unit may include a single display or a plurality of displays of different sizes. In a specific implementation of this embodiment of the present invention, the touch panel used by the input unit 1301 may also be used as a display panel of the output unit. For example, after the touch panel detects a touch or approaching gesture operation on the touch panel, the touch panel transmits the operation to the processor unit 1302 to determine a type of a touch event, and then the processing unit provides corresponding visual output on the display panel based on the type of the touch event. In FIG. 13, the input unit 1301 and the output unit are used as two independent parts to implement input and output functions of the terminal, but in some embodiments, the touch control panel and the display panel may be integrated to implement the input and output functions of the terminal. For example, the image output unit may display various graphical user interfaces (GUI) as virtual control components. The graphical user interfaces include but are not limited to a window, a scroll bar, an icon, and a clipboard, so that the user performs an operation in a touch control manner.

In a specific implementation of this embodiment of the present invention, the image output unit includes a filter and an amplifier that are configured to filter and amplify a video output by the processor unit 1302. An audio output unit includes a digital-to-analog converter, and the digital-to-analog converter is configured to convert an audio signal output by the processor unit from a digital format to an analog format.

The storage unit 1305 may be configured to store the software program and the module. The processor unit 1302 performs various functional applications of the terminal and processes data by running the software program and the module that are stored in the storage unit 1305. The storage unit 1305 mainly includes a program storage area and a data storage area. The program storage area may store an operating system and an application program required by at least one function, such as a sound play program and an image play program. The data storage area may store data (such as audio data or a phonebook) or the like that is created based on use of the terminal. In a specific implementation of this embodiment of the present invention, the storage unit 1305 may include a volatile memory such as a nonvolatile random access memory (NVRAM), a phase change random access memory (PRAM), or a magneto-resistive random access memory (MRAM for short), or may include a nonvolatile memory such as at least one magnetic disk storage component, an electrically erasable programmable read-only memory (EEPROM), or a flash component such as a NOR flash memory or a NAND flash memory. The non-volatile memory stores an operating system and an application program that are executed by the processor unit 1302. The processor unit 1302 loads a running program and data from the non-volatile memory to the memory, and stores data content in a massive storage apparatus. The operating system includes various components and/or drivers that are configured to control and manage regular system tasks such as memory management, storage device control, and power management, and that facilitate communication between all types of software and hardware. In an implementation of this embodiment of the present invention, the operating system may be the ANDROID system of GOOGLE, the IOS system developed by APPLE, the WINDOWS operating system developed by MICROSOFT, or the like, or may be an embedded operating system such as VXWORKS.

The application program includes any application installed on the terminal, and includes but is not limited to a browser, an email, an instant messaging service, word processing, keyboard virtualization, a window widget, encryption, digital right management, voice recognition, voice duplication, positioning (such as a function provided by a global positioning system), music playback, and the like.

The power supply 1307 is configured to supply power to different parts of the terminal to maintain running of the parts. Generally, the power supply may be a built-in battery, for example, a common lithium-ion battery or a NiMH battery, or includes an external power supply that directly supplies power to the terminal, for example, an AC adapter. In some implementations of this embodiment of the present invention, the power supply may also be defined in a wider scope. For example, the power supply may further include a power management system, a charging system, a power failure detection circuit, a power converter or inverter, a power status indicator (such as a light emitting diode), and any other component related to power generation, management, and distribution of the terminal.

It should be noted that, when the user uses the terminal, the input device 1301 receives information or user input, the storage device 1305 stores corresponding code and configuration data or user data that is related to a processing process, and the processor 1302 runs the corresponding code, and processes the received information, to generate and output a corresponding interface and data. The corresponding interface and data are finally presented to the user by the output unit 1304.

In addition, this embodiment of the present invention further provides an improvement on the input unit 1301 of the terminal, and in particular, an improvement on a drive circuit of a display screen in the input unit 1301.

In addition, this embodiment of the present invention further provides an improvement on the communications unit of the terminal, and in particular, an improvement on the radio frequency circuit in the communications unit.

In addition, in this embodiment of the present invention, whether the mobile phone is held in a left hand or a right hand is identified by using a sensor, and the interface is adjusted based on a determining result. In an example of this embodiment of the present invention, the input unit 1301 is a corresponding sensor.

It should be noted that this embodiment of the present invention further provides a computer readable storage medium. The computer readable storage medium stores a computer program, and the program is executed by the processor unit 1302.

This embodiment of the present invention further provides a computer program product including an instruction. When the computer program product is run on a computer, the processor unit 1302 is enabled to perform the method described in FIG. 1.

Steps of methods or algorithms described in the embodiments disclosed in this specification may be implemented by hardware, a software module executed by a processor, or a combination thereof. The software instruction may include a corresponding software module. The software module may be stored in a random access memory, a flash memory, a read-only memory, an erasable programmable read only memory (erasable programmable read-only memory, EPROM), an electrically erasable programmable read only memory (English: electrically erasable programmable read-only memory, EEPROM), a hard disk, an optical disc, or a storage medium in any other forms well-known in the art. For example, a storage medium is coupled to the processor, so that the processor can read information from the storage medium or write information into the storage medium. The storage medium may also be a component of the processor. The processor and the storage medium may exist in the user equipment as discrete components.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application.

What is claimed is:

1. A method for displaying a plurality of content cards on a terminal, the method comprising:
    detecting a start location and a sliding direction of finger sliding associated with the content cards, wherein the content cards comprise a current content card and one or more stacked content cards, wherein display modes of the content cards comprise a stacking mode and a browsing mode, wherein content of the current content card and an edge of the one or more stacked content cards are displayed in the stacking mode, wherein the content of the current content card is displayed in full screen in the browsing mode, and wherein a display area of the current content card is divided into an edge area and a content display area;
    determining whether to switch between the stacking mode and the browsing mode or to continuously display content of adjacent content cards in the browsing mode based on whether a current display mode of the current content card is the stacking mode or the browsing mode, a location relationship between the start location and the content display area of the current content card, the sliding direction, and whether an upper part or a lower part of the current content card is within a predetermined area, wherein the adjacent content cards comprise the current content card and a content card of the one or more stacked content cards that is adjacent to the current content card; and
    either switching between the stacking mode and the browsing mode or continuously displaying content of the adjacent content cards in the browsing mode based on the determining.

2. The method of claim 1, wherein the predetermined area comprises a first predetermined area, and wherein the method further comprises:
    determining that the current display mode of the current content card is the stacking mode, that the start location falls within the content display area, that the sliding direction is upward, and that the upper part of the current content card is within the first predetermined area; and
    switching from the stacking mode to the browsing mode in response to determining that the current display mode of the current content card is the stacking mode, that the start location falls within the content display area, that the sliding direction is upward, and that the upper part of the current content card is within the first predetermined area.

3. The method of claim 2, wherein the predetermined area comprises a second predetermined area that is different than the first predetermined area, and wherein the method further comprises:
    determining that the current display mode of the current content card is the browsing mode, that the start location falls within the content display area, that the content display area comprises an upper part of card content, that the sliding direction is downward, and that the upper part of the current content card is within the second predetermined area; and
    switching the current display mode of the current content card from the browsing mode to the stacking mode in response to determining that the current display mode of the current content card is the browsing mode, that the start location falls within the content display area, that the content display area comprises an upper part of card content, that the sliding direction is downward, and that the upper part of the current content card is within the second predetermined area.

4. The method of claim 3, wherein the predetermined area comprises a third predetermined area that is different than the first predetermined area and the second predetermined area, and wherein the method further comprises:
    determining that the current display mode of the current content card the browsing mode, that the start location falls within the content display area, that the content display area comprises a lower part of card content, that the sliding direction is upward, and that the lower part of the current content card is within the third predetermined area; and
    continuously displaying the content of the adjacent content cards in the browsing mode in response to determining that the current display mode of the current content card is the browsing mode, that the start location falls within the content display area, that the content display area comprises a lower part of card content, that the sliding direction is upward, and that the lower part of the current content card is within the third predetermined area.

5. The method of claim 4, wherein continuously displaying the content of the adjacent content cards further comprises displaying the lower part of the current content card and an upper part of a content card adjacent to the current content card.

6. The method of claim 2, wherein after switching from the stacking mode to the browsing mode, the method further comprises translating card content upward in the content display area of the current content card.

7. A terminal for displaying a plurality of content cards, the terminal comprising:
- a memory configured to store a computer program; and
- a processor coupled to the memory, wherein when executed by the processor, the computer program causes the processor to be configured to:
  - detect a start location and a sliding direction of finger sliding associated with the content cards, wherein the content cards comprise a current content card and one or more stacked content cards, wherein display modes of the content cards comprise a stacking mode and a browsing mode, wherein content of the current content card and an edge of the one or more stacked content cards are displayed in the stacking mode, wherein the content of the current content card is displayed in full screen in the browsing mode, and wherein a display area of the current content card is divided into an edge area and a content display area;
  - determine whether to switch between the stacking mode and the browsing mode or to continuously display content of adjacent content cards in the browsing mode based on whether a current display mode of the current content card is the stacking mode or the browsing mode, a location relationship between the start location and the content display area of the current content card, the sliding direction, and whether an upper part or a lower part of the current content card is within a predetermined area, wherein the adjacent content cards comprise the current content card and a content card of the one or more stacked content cards that is adjacent to the current content card; and
  - either switch between the stacking mode and the browsing mode or continuously display content of the adjacent content cards in the browsing mode based on the determination.

8. The terminal of claim 7, wherein the predetermined area comprises a first predetermined area, and wherein the computer program further causes the processor to be configured to:
- determine that the current display mode of the current content card is the stacking mode, that the start location falls within the content display area, that the sliding direction is upward, and that the upper part of the current content card is within the first predetermined area; and
- switch from the stacking mode to the browsing mode in response to determining that the current display mode of the current content card is the stacking mode, that the start location falls within the content display area, that the sliding direction is upward, and that the upper part of the current content card is within the first predetermined area.

9. The terminal of claim 8, wherein the predetermined area comprises a second predetermined area that is different than the first predetermined area, and wherein the computer program further causes the processor to be configured to:
- determine that the current display mode of the current content card is the browsing mode, that the start location falls within the content display area, that the content display area comprises an upper part of card content, that the sliding direction is downward, and that the upper part of the current content card is within the second predetermined area; and
- switch the current display mode of the current content card from the browsing mode to the stacking mode in response to determining that the current display mode of the current content card is the browsing mode, that the start location falls within the content display area, that the content display area comprises an upper part of card content, that the sliding direction is downward, and that the upper part of the current content card is within the second predetermined area.

10. The terminal of claim 9, wherein the predetermined area comprises a third predetermined area that is different than the first predetermined area and the second predetermined area, and wherein the computer program further causes the processor to be configured to:
- determine that the current display mode of the current content card is the browsing mode, that the start location falls within the content display area, that the content display area comprises a lower part of card content, that the sliding direction is upward, and that the lower part of the current content card is within the third predetermined area; and
- continuously display the content of the adjacent content cards in the browsing mode in response to determining that the current display mode of the current content card is the browsing mode, that the start location falls within the content display area, that the content display area comprises a lower part of card content, that the sliding direction is upward, and that the lower part of the current content card is within the third predetermined area.

11. The terminal of claim 10, wherein when continuously displaying the content of the adjacent content cards, the computer program further causes the processor to be configured to display the lower part of the current content card and an upper part of a content card adjacent to the current content card.

12. The terminal of claim 8, wherein after switching from the stacking mode to the browsing mode, the computer program further causes the processor to be configured to translate card content upward in the content display area of the current content card.

13. A non-transitory computer readable storage medium comprising an instruction for displaying a plurality of content cards on a computer, wherein when running the instruction on the computer, the computer is enabled to perform:
- detect a start location and a sliding direction of finger sliding associated with the content cards, wherein the content cards comprise a current content card and one or more stacked content cards, wherein display modes of the content cards comprise a stacking mode and a browsing mode, wherein content of the current content card and an edge of the one or more stacked content cards are displayed in the stacking mode, wherein the content of the current content card is displayed in full screen in the browsing mode, and wherein a display area of the current content card is divided into an edge area and a content display area;
- determine whether to switch between the stacking mode and the browsing mode or to continuously display content of adjacent content cards in the browsing mode based on whether a current display mode of the current content card is the stacking mode or the browsing mode, a location relationship between the start location and the content display area of the current content card, the sliding direction, and whether an upper part or a lower part of the current content card is within a predetermined area, wherein the adjacent content cards comprise the current content card and a content card of the one or more stacked content cards that is adjacent to the current content card; and either switch between the stacking mode and the browsing mode or continuously display content of the adjacent content cards in the browsing mode based on the determination.

14. A non-transitory computer program product comprising computer-executable instructions for displaying a plurality of content cards on a terminal that, when executed by a processor, cause the terminal to:

detect a start location and a sliding direction of finger sliding, wherein the content cards comprise a current content card and one or more stacked content cards, wherein display modes of the content cards comprise a stacking mode and a browsing mode, wherein content of the current content card and an edge of the one or more stacked content cards are displayed in the stacking mode, wherein the content of the current content card is displayed in full screen in the browsing mode, and wherein a display area of the current content card is divided into an edge area and a content display area;

determine whether to switch between the stacking mode and the browsing mode or to continuously display content of adjacent content cards in the browsing mode based on whether a current display mode of the current content card is the stacking mode or the browsing mode, a location relationship between the start location and the content display area of the current content card, the sliding direction, and whether an upper part or a lower part of the current content card is within a predetermined area, wherein the adjacent content cards comprise the current content card and a content card of the one or more stacked content cards that is adjacent to the current content card; and either switch between the stacking mode and the browsing mode or continuously display content of the adjacent content cards in the browsing mode based on the determination.

15. The non-transitory computer program product of claim 14, wherein the predetermined area comprises a first predetermined area, and wherein the computer-executable instructions further cause the terminal to:

determine that the current display mode of the current content card is the stacking mode, that the start location falls within the content display area, that the sliding direction is upward, and that the upper part of the current content card is within the first predetermined area; and switch from the stacking mode to the browsing mode in response to determining that the current display mode of the current content card is the stacking mode, that the start location falls within the content display area, that the sliding direction is upward, and that the upper part of the current content card is within the first predetermined area.

16. The non-transitory computer program product of claim 15, wherein after switching from the stacking mode to the browsing mode, the computer-executable instructions further cause the terminal to translate card content upward in the content display area of the current content card in response to determining that the current display mode of the current content card is the stacking mode, that the start location falls within the content display area, that the sliding direction is upward, and that the upper part of the current content card is within the first predetermined area.

17. The non-transitory computer program product of claim 15, wherein the predetermined area comprises a second predetermined area that is different than the first predetermined area, and wherein the computer-executable instructions further cause the terminal to:

determine that the current display mode of the current content card is the browsing mode, that the start location falls within the content display area, that the content display area comprises an upper part of card content, that the sliding direction is downward, and that the upper part of the current content card is within the second predetermined area; and switch the current display mode of the current content card from the browsing mode to the stacking mode in response to determining that the current display mode of the current content card is the browsing mode, that the start location falls within the content display area, that the content display area comprises an upper part of card content, that the sliding direction is downward, and that the upper part of the current content card is within the second predetermined area.

18. The non-transitory computer program product of claim 17, wherein the predetermined area comprises a third predetermined area that is different than the first predetermined area and the second predetermined area, and wherein the computer-executable instructions further cause the terminal to:

determine that the current display mode of the current content card is the browsing mode, that the start location falls within the content display area, that the content display area comprises a lower part of card content, that the sliding direction is upward, and that the lower part of the current content card is within the third predetermined area; and continuously display the content of the adjacent content cards in the browsing mode in response to determining that the current display mode of the current content card is the browsing mode, that the start location falls within the content display area, that the content display area comprises a lower part of card content, that the sliding direction is upward, and that the lower part of the current content card is within the third predetermined area.

19. The non-transitory computer program product of claim 18, wherein when continuously displaying the content of the adjacent content cards in the browsing mode, the computer-executable instructions further cause the terminal to display the lower part of the current content card and an upper part of a content card that is adjacent to the current content card.

20. The non-transitory computer program product of claim 14, wherein the predetermined area comprises a first predetermined area, a second predetermined area, and a third predetermined area, and wherein the first predetermined area, the second predetermined area, and the third predetermined area are different from each other.

* * * * *

UNITED STATES PATENT AND TRADEMARK OFFICE
CERTIFICATE OF CORRECTION

PATENT NO. : 11,079,930 B2  
APPLICATION NO. : 16/754560  
DATED : August 3, 2021  
INVENTOR(S) : Liwei Huang, Kai Qian and Zhiyan Yang Page 1 of 1

It is certified that error appears in the above-identified patent and that said Letters Patent is hereby corrected as shown below:

On the Title Page

Item (57) Abstract, Line 6: "method includes: detecting a" should read "method includes detecting a"

In the Claims

Claim 4, Column 18, Line 51: "content card the browsing" should read "content card is the browsing"

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*